(12) United States Patent  
O'Connell (10) Patent No.: US 9,452,641 B2
(45) Date of Patent: Sep. 27, 2016

(54) RECREATIONAL VEHICLE (71) Applicant: Yvolve Sports Ltd, Dublin (IE)

(72) Inventor: Thomas O'Connell, Dublin 2 (IE)

(73) Assignee: YVOLVE SPORTS LTD., Dublin (IE)

(*) Notice: Subject to any disclaimer, the term of this patent is extended or adjusted under 35 U.S.C. 154(b) by 0 days.

(21) Appl. No.: 14/327,678

(22) Filed: Jul. 10, 2014

(65) Prior Publication Data

US 2015/0239292 A1  Aug. 27, 2015

(30) Foreign Application Priority Data

Feb. 24, 2014  (CN) .......................... 2014 1 0062294

(51) Int. Cl.
| | | |
|---|---|---|
| *B60B 35/02* | (2006.01) | |
| *B60B 35/00* | (2006.01) | |
| *B62K 9/02* | (2006.01) | |
| *B62H 7/00* | (2006.01) | |
| *B62K 25/02* | (2006.01) | |

(52) U.S. Cl.
CPC .............. *B60B 35/009* (2013.01); *B62H 7/00* (2013.01); *B62K 9/02* (2013.01); *B62K 25/02* (2013.01); *B60B 35/02* (2013.01); *B60B 2900/351* (2013.01); *B60Y 2200/81* (2013.01); *B62K 2025/025* (2013.01)

(58) Field of Classification Search
CPC .................... A61G 2005/1083; B60B 27/026; B60B 35/1027; B60B 35/009; B60B 35/02; B60B 35/06; B62K 25/02; B62K 2206/00; B62K 5/02; B62K 5/023; B62K 9/00; B62K 9/02; B62K 3/002; B62K 2025/025; B60K 11/08; B60K 11/085
See application file for complete search history.

(56) References Cited

U.S. PATENT DOCUMENTS

| | | | | |
|---|---|---|---|---|
| 3,014,547 | A | * | 12/1961 | Van Der Lely ............... 180/308 |
| 4,526,392 | A | * | 7/1985 | Berkstresser ................. 280/282 |
| 4,789,173 | A | * | 12/1988 | Lofgren et al. ............ 280/288.1 |
| 5,769,441 | A | * | 6/1998 | Namngani .................... 280/208 |
| 6,817,617 | B2 | * | 11/2004 | Hayashi ..................... 280/5.509 |
| 7,044,491 | B2 | * | 5/2006 | Kettler et al. ................ 280/282 |
| 7,429,055 | B2 | * | 9/2008 | DeForest, Jr. ................ 280/282 |
| 7,481,443 | B2 | * | 1/2009 | Shim et al. ................... 280/282 |
| 7,597,331 | B2 | * | 10/2009 | Schulte et al. .............. 280/7.15 |
| 7,731,214 | B2 | * | 6/2010 | Laird ............................ 280/279 |
| 7,845,666 | B2 | * | 12/2010 | Lynch et al. ................. 280/282 |
| 8,011,680 | B2 | * | 9/2011 | Chelgren ............... 280/124.171 |
| 8,292,315 | B1 | * | 10/2012 | Pelkonen ..................... 280/266 |
| 8,905,420 | B2 | * | 12/2014 | Spindle ...................... 280/250.1 |
| 2003/0034635 | A1 | * | 2/2003 | Ludovici ..................... 280/647 |
| 2006/0022422 | A1 | * | 2/2006 | Tasma ................... 280/124.135 |
| 2008/0120803 | A1 | * | 5/2008 | Bryant .............................. 16/47 |
| 2008/0277901 | A1 | * | 11/2008 | Catelli et al. ................ 280/287 |

\* cited by examiner

*Primary Examiner* — Emma K Frick
(74) *Attorney, Agent, or Firm* — Millman IP Inc.

(57) ABSTRACT

A recreational vehicle includes two parallel wheels installed at a front wheel set or a rear wheel set, and the axes of the two wheels are not configured to be aligned on the same horizontal line, and the two wheels are installed at a frame through an adjusting module movable with respect to the frame, and a fixing module is installed between the frame and adjusting module for controlling whether to move the adjusting module with respect to the frame. The recreational vehicle is capable of adjusting the width of the rear wheel that touches the ground to enhance the variability, adaptability and practicality of the vehicle.

11 Claims, 8 Drawing Sheets

RECREATIONAL VEHICLE

FIELD OF THE INVENTION

The present invention relates to a recreational vehicle, in particular the recreational vehicle capable of adjusting the width of a front wheel or a rear wheel that touches the ground to improve the variability, adaptability and practicality of the vehicle.

BACKGROUND OF THE INVENTION

In general, children are helped by others to support their balance or auxiliary wheels are installed on both sides of a rear wheel to achieve the learning purpose when the children learn how to ride a vehicle. However, such arrangement can only achieve the effects of stabilizing a vehicle body and preventing the children from falling down from the vehicle, but it has not much practical help on the effect of learning how to ride a vehicle sooner. On the contrary, children may even become psychologically dependent over time and fail to develop the potential of maintaining their balance.

Therefore, a recreational vehicle (also known as a slider or walker) without any pedals or chain is introduced into the market. Basically, the recreational vehicle comprises a front fork installed at the front of a frame for connecting a handlebar and a front wheel, a rear wheel installed at the other end of the frame, a seat installed at the middle section of the frame and provided for a rider to sit thereon, so that the rider can hold the handlebar by both hands and stomp at the ground by both legs to push the front wheel and rear wheel to rotate in order to drive the recreational vehicle forward and train the children's muscle strength and balance.

In a conventional recreational vehicle, both front and rear wheels are single wheels, so that the wheels can slide by touching the tire tread of each wheel on the ground. To provide flexible control and operability, the width of the tire tread of each wheel is substantially equal to the width of the tire of a general children's vehicle, and the tire tread of the wheel is not adjustable, so that the level of difficulty of the learning is still very high. As to a younger child, the learning and practice are relatively more difficult and dangerous, and such recreational vehicle reduces the adaptability and practicality significantly.

SUMMARY OF THE INVENTION

Therefore, it is a primary objective of the present invention to provide a recreational vehicle capable of adjusting the width of a front wheel or a rear wheel that touches the ground to improve the variability, adaptability and practicality of the vehicle.

To achieve the aforementioned objective, the present invention provides a recreational vehicle having a seat installed at the middle section of a frame, a front wheel set and a rear wheel set installed at the front and the rear of the frame respectively and provided for touching the ground, and a handlebar installed at the front of the frame, characterized in that the recreational vehicle comprises two parallel wheels installed to the front wheel set or the rear wheel set, wherein the axes of the two wheels are not configured to be aligned on the same horizontal line, and the two wheels are installed at the frame through an adjusting module that is movable with respect to the frame, and a fixing module is installed between the frame and the adjusting module for controlling whether to move the adjusting module with respect to the frame.

With the aforementioned characteristics, the recreational vehicle of the present invention has the wheels of the front wheel set or rear wheel set whose axes are not configured to be aligned on the same horizontal line, so that a user can select a side of the two wheels with a greater tire tread spacing or a side of the two wheels with a smaller tire tread spacing to touch with the ground by the effect of the fixing module. Therefore, the stability of the vehicle body can be enhanced to help younger children to learn how to ride the vehicle when the side of the two wheels with a greater tire tread spacing is in contact with the ground or the flexibility of riding the vehicle can be maintained to provide more fun to the ride when the side of the two wheels with a smaller tire tread spacing is in contact with the ground.

Specifically, the recreational vehicle of the present invention has the following advantages and effects:

1. A user can adjust the width of the wheel set that touches the ground according to the user's age and riding skill, and thus the invention provides a more practical and safe ride.

2. The recreational vehicle of the invention can satisfy the requirements of children of different ages, and thus the invention provides better adaptability.

3. The whole recreational vehicle can be erected for parking or storage by setting the two wheels with a greater tire tread spacing of the rear wheel set to be touched with the ground, and thus the invention improves the convenience of use.

DESCRIPTION OF THE PREFERRED EMBODIMENTS

The aforementioned and other objectives and advantages of the present invention will become clearer in light of the following detailed description of illustrative embodiments of this invention described in connection with the drawings. It is intended that the embodiments and drawings disclosed herein are to be considered illustrative rather than restrictive.

Figure 1:
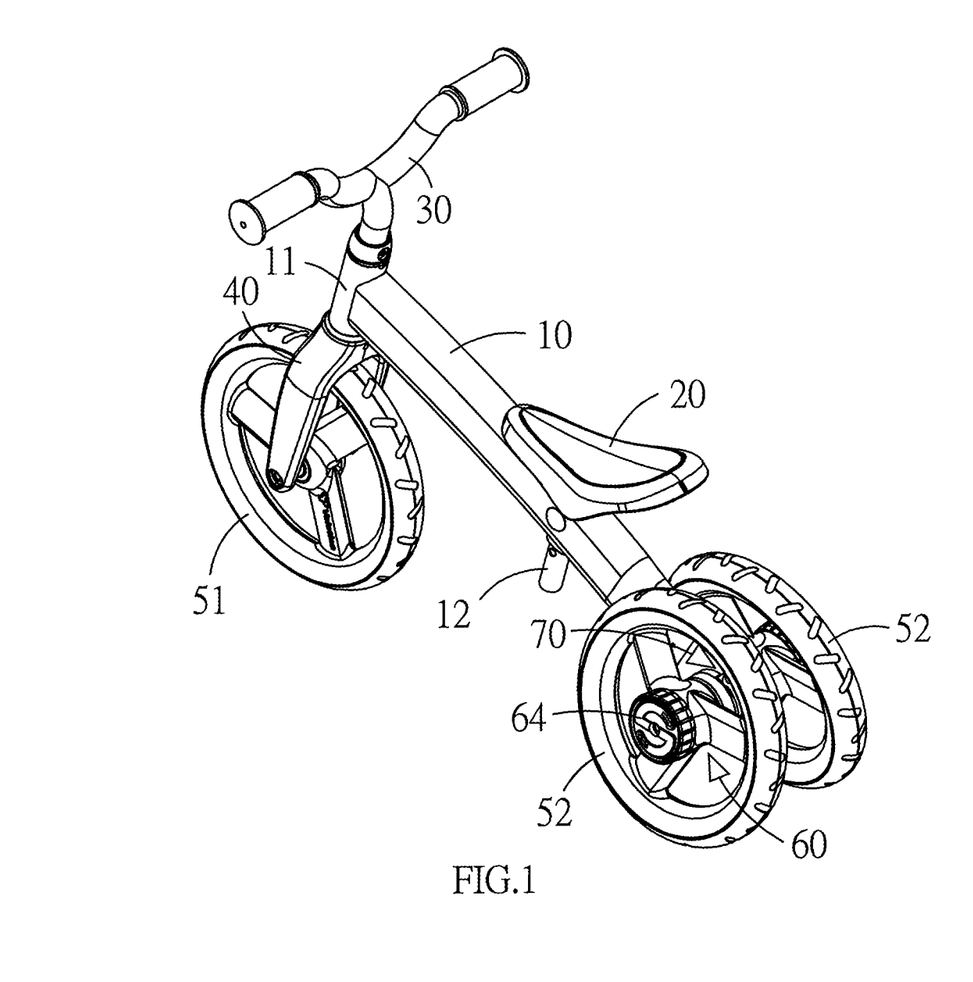
FIG. 1 is a perspective view of a recreational vehicle of the present invention.
Figure 2:
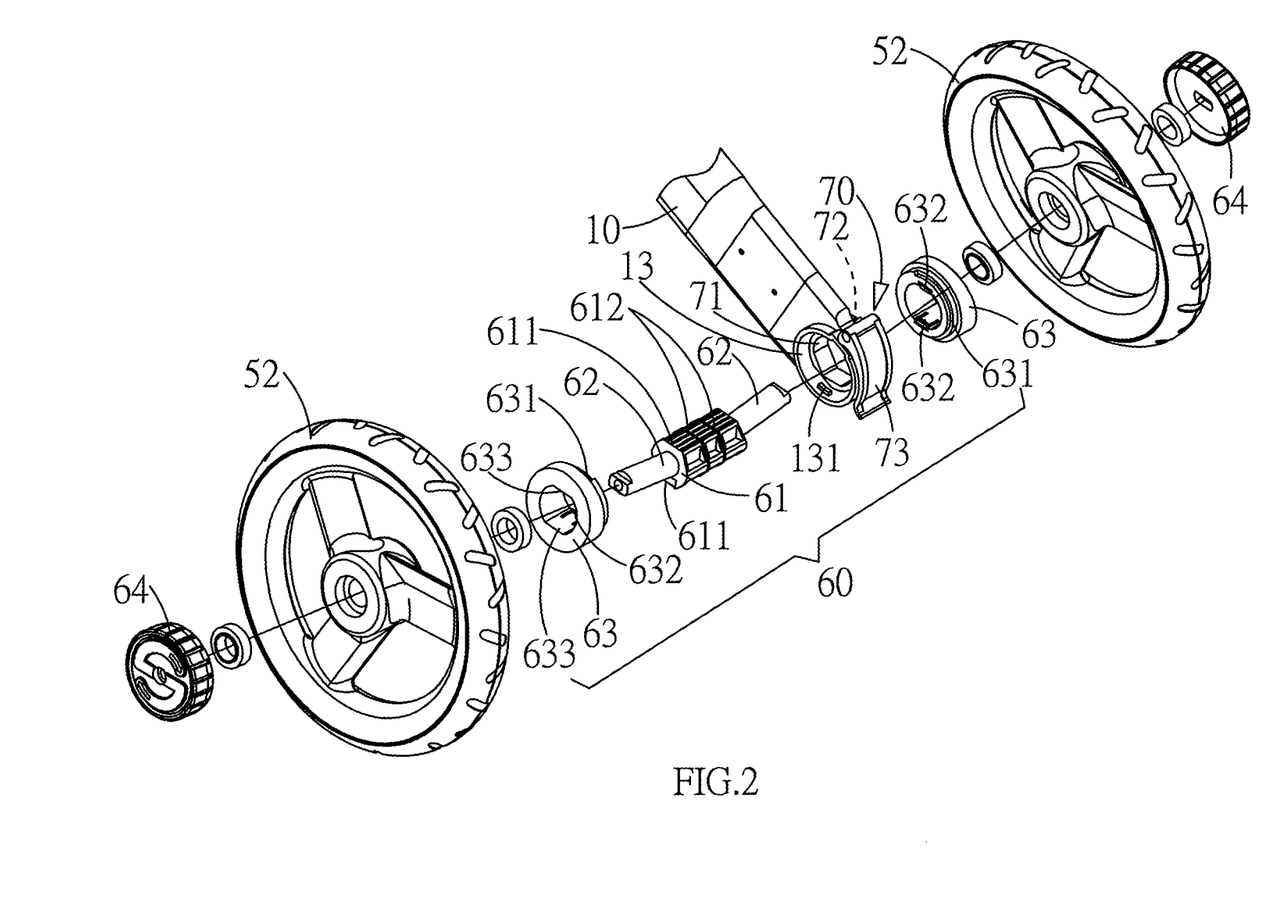
FIG. 2 is an exploded view of a rear wheel set of a first preferred embodiment of the present invention.
Figure 3:
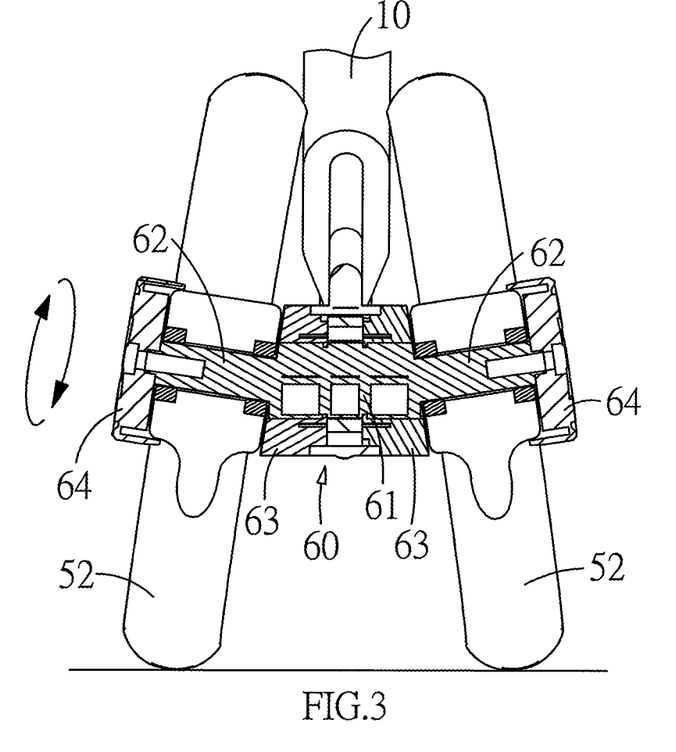
FIG. 3 is a cross-sectional view of a rear wheel set of the first preferred embodiment of the present invention.

With reference to FIGS. 1 and 2 for a perspective view and an exploded view of a recreational vehicle in accordance with the first preferred embodiment of the present invention respectively, the recreational vehicle is capable of adjusting the width of a front wheel set or a rear wheel set that touches the ground to improve the variability, adaptability and practicality of the vehicle. The recreational vehicle comprises a seat 20 installed at a middle section of a frame 10, a front wheel set and a rear wheel set installed at the front and the rear of the frame 10 respectively and provided for touching the ground, and a handlebar 30 installed at the front of the frame 10.

In this preferred embodiment, the recreational vehicle has a front tube 11 and a seat tube 12 installed at the front and the middle section of the frame 10 respectively, and a front fork 40 installed at the front tube 11, wherein the handlebar 30 is installed at an upper end of the front fork 40, and the front wheel set has a wheel 51 axially installed at a lower end of the front fork 30, and the seat 20 is mounted onto the seat tube 12.

The present invention is characterized in that the recreational vehicle comprises two parallel wheels 52 installed at the rear wheel set, and the axes of the two wheels 52 are not configured to be aligned on the same horizontal line, and the two wheels 52 are installed at a rear end of the frame 10 through an adjusting module 60 that can move with respect to the frame 10, and a fixing module 70 installed between the frame 10 and the adjusting module 60 for controlling whether to move the adjusting module 60 with respect to the frame 10. In other words, the two wheels 52 of the rear wheel set have the downwardly tapered or upwardly tapered effect under the action of the adjusting module 60, and the fixing module 70 is provided for keeping the two wheels 52 of the rear wheel set at the downwardly tapered or upwardly tapered condition.

Of course, the front wheel set may have two parallel wheels (not shown in the figure), and the two wheels of the front wheel set can be fixed to a downwardly tapered or upwardly tapered condition through the adjusting module and the fixing module for its use.

In a preferred embodiment as shown in FIGS. 1 to 6, the frame 10 has a circular slot 13 transversally formed at the rear end of the frame 10, and the fixing module 70 has a hoop 71 set into the circular slot 13 and movable in the circular slot 13, and a pull rod 72 passing from an outer side of the frame 10 through a wall of the circular slot 13 and coupled to the hoop 71, wherein a cam wrench 73 is installed at a rear end of the pull rod 72 for dragging the pull rod 72 to move reciprocally in an axial direction.

The adjusting module 60 has a shaft member 61 installed into the hoop 71 and rotatable in the hoop 71, and a hub 62 disposed separately at both ends of the shaft member 61 for installing the wheel 52, wherein the axes of the two hub 62 are not set to align with the same horizontal line; and the shaft member 61 can be dragged together with the hoop 71 by the cam wrench 73 and the pull rod 72, and the shaft member 61 is pressed against the circular slot 13 and unable to rotate, or the shaft member 61 is not pressed against the circular slot 13 and capable of changing a rotating status.

The frame 10 has a circular slot 13 formed at a rear end of the frame 10, and the fixing module 70 has a hoop 71 set into the circular slot 13 and displaceable in the circular slot 13, and a pull rod 72 passing from an outer side of the frame 10 through a wall of the circular slot 13 and coupled to the hoop 71, and the pull rod 72 has a cam wrench 73 installed at a rear end of the pull lord 72 for dragging the pull rod 72 to move reciprocally in an axial direction, and the adjusting module 60 has a shaft member 61 set into the hoop 71 and rotatable in the hoop 71, and a hub 62 is installed separately at both ends of the shaft member 61 for installing a wheel 52, and the axes of the two hubs 62 are not configured to be aligned on the same horizontal line; and the shaft member 61 is dragged together with the hoop 71 by the cam wrench 73 and the pull rod 72, so that the shaft member 61 is pressed against the circular slot 13 and cannot rotate, or not pressed against the circular slot 13 to allow a change of the rotating status. The adjusting module 60 further has a bushing 63 disposed separately at the positions where the shaft member 61 is extended out from both sides of the hoop 71 and rotatable with the shaft member 61 in the circular slot 13, and the bushing 63 and the circular slot 13 abut against each other to produce a fixing effect to restrict them from rotating.

Figure 6:
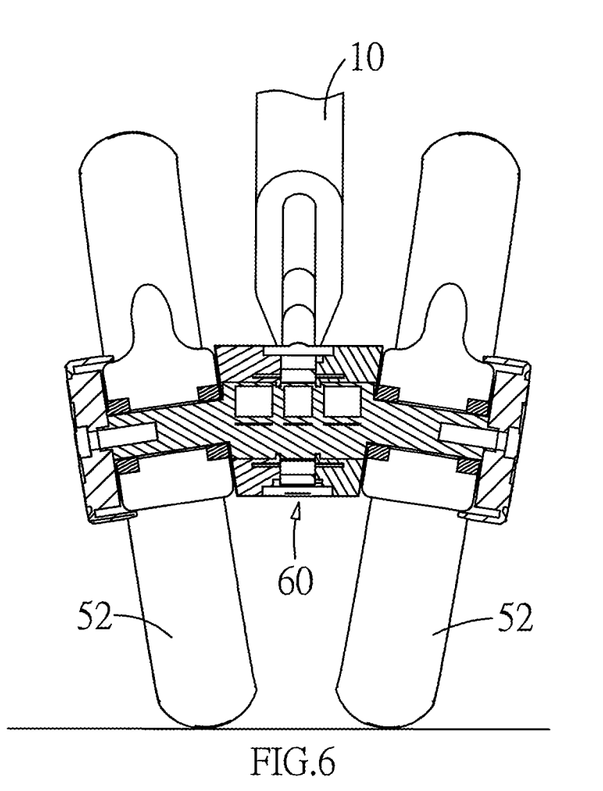
FIG. 6 is a schematic view of another using status of a rear wheel set of the first preferred embodiment of the present invention.
Figure 7:
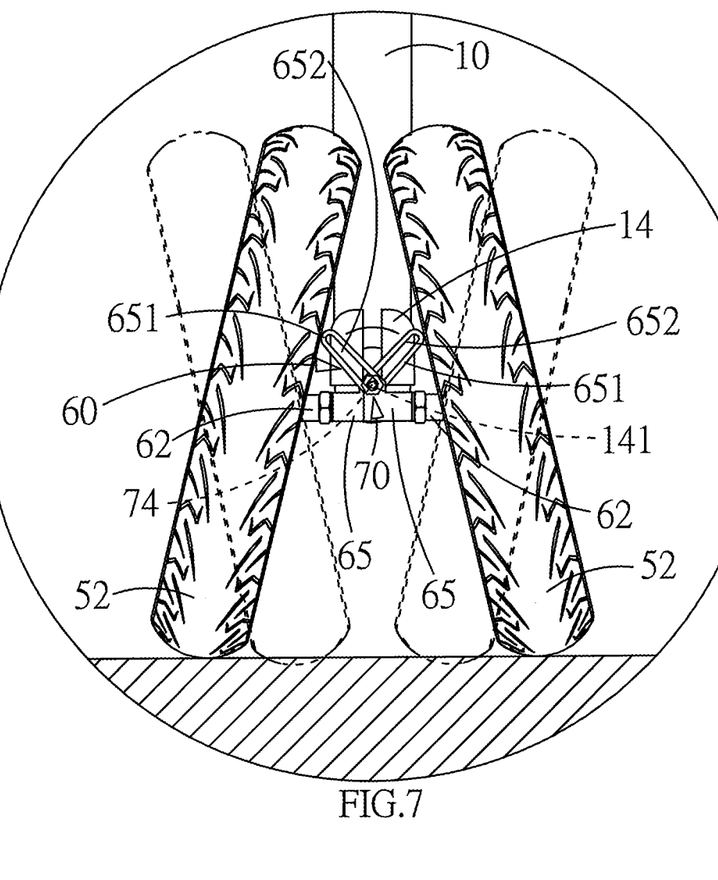
FIG. 7 is a schematic view of a using status of a rear wheel set of a second preferred embodiment of the present invention.

In the foregoing preferred embodiment, the adjusting module 60 comprises a knob 64 installed on an outer side of one of the wheels 52 of the rear wheel set and fixed to the hub 62 of the wheel 52 and rotatable with the shaft member 61, so that the fixing module 70 may be released from the restriction with the shaft member 61 and the knob 64 may be turned direction to adjust the two wheels 52 of the rear wheel set in a downwardly tapered status (as shown in FIG. 6) or an upwardly tapered status (as shown in FIG. 7).

Since the recreational vehicle of the present invention has two wheels installed at the front wheel set or the rear wheel set and having two axes not configured to be aligned on the same horizontal line, therefore users can select a side of the two wheels with a greater tire tread spacing a side of the two wheels with a smaller tire tread spacing to be in contact with the ground under the effect of the fixing module, such that when the side of the two wheels with a greater tire tread spacing is in contact with the ground, the stability of the vehicle body is enhanced to assist younger children to learn how to ride the vehicle, and when the side of the two wheels with a smaller tire tread spacing is in contact with the ground, the flexibility of riding can be maintained to provide more fun to the ride.

Figure 4:
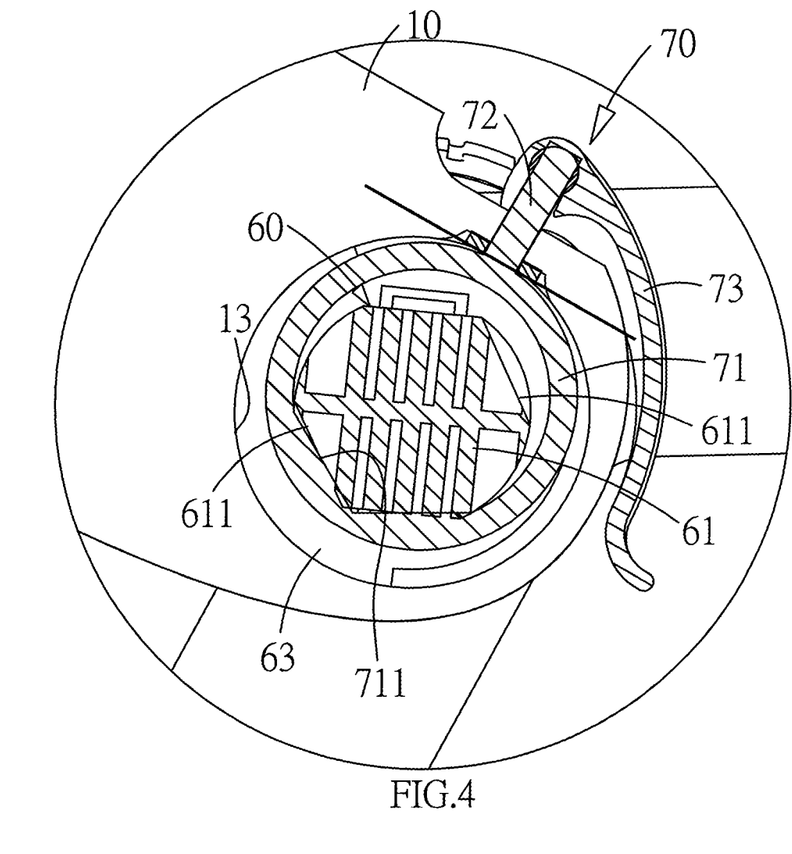
FIG. 4 is a cross-sectional view of a shaft member being restricted by a hoop from rotating in accordance with the first preferred embodiment of the present invention.

In the foregoing preferred embodiment, the shaft member 61 has a first straight section 611 disposed at opposite positions of an outer periphery of the shaft member 61 (wherein the included angle of the two first straight section 611 is equal to 180°), and the hoop 71 has a second straight section 711 disposed at an inner periphery of the hoop 71 and opposite to the other side coupled to the pull rod 72 for pressing against any one of the first straight sections 611, so that the rotation of the shaft member 61 with respect to the hoop 71 is limited by the pressing effect of the first straight section 611 and the second straight section 711 to achieve a more stable and reliable fixing effect.

Figure 5:
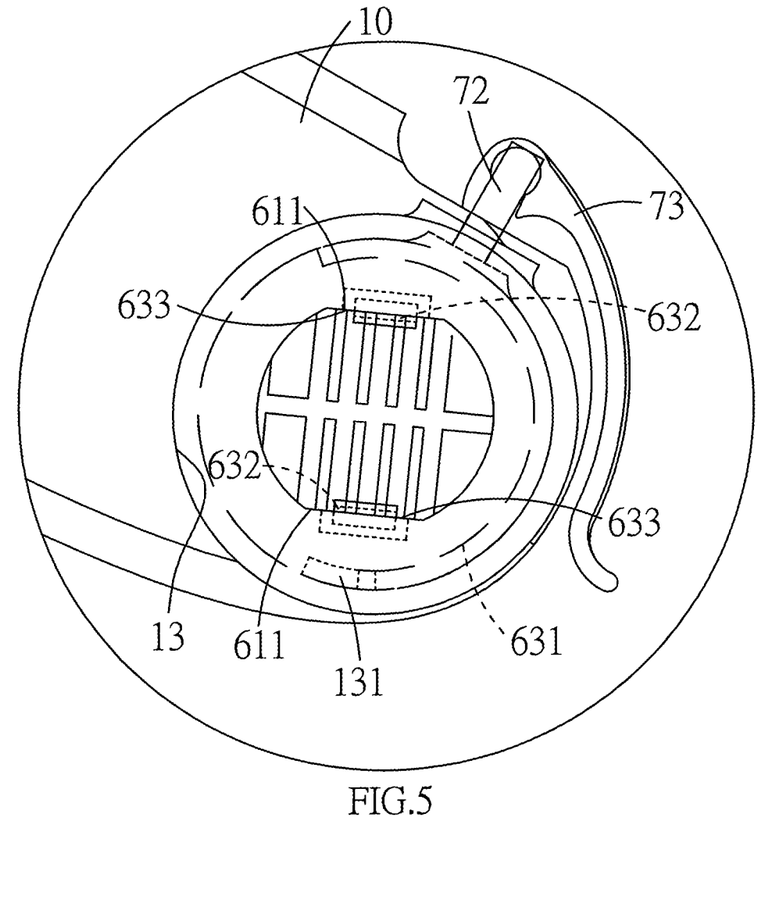
FIG. 5 is a schematic view of a shaft member coupled to a bushing in accordance with the first preferred embodiment of the present invention.

The adjusting module 60 has a bushing 63 disposed separately at positions of the shaft member 61 that is extended out from both sides of the hoop 71 and rotatable together with the shaft member 61 in the circular slot 13, and the whole recreational vehicle 10 has a groove 631 formed at an outer periphery of one of the bushings 63 for limiting the rotating angle (180°) of the shaft member 61, and at least one bump 131 formed at an inner periphery of the circular slot 13 of the frame 10 for extending into the groove 631. With the effect of the bump 131 and the groove 631, users can quickly identify whether or not the shaft member 61 has rotated to a fixed position, and a better operation hand feel is provided.

Of course, the adjusting module 60 of the recreational vehicle has a bushing 63 installed onto the shaft member 61 and at position of extending out from both sides of the hoop 71 and rotatable in the circular slot 13 of the frame 10, wherein at least one of the bushing 63 has a groove 631 formed at the outer periphery of the bushing 63 for restricting the rotating angle (180°) of the shaft member 61, and at least one bump 131 formed at the inner periphery of the frame 10 for extending into the groove 631; and the adjusting module 60 preferably includes a knob 64 installed on an outer side of one of the wheels 52 of the rear wheel set and coupled to the hub 62 that is installed at the wheel 52 and rotatable together with the shaft member 61.

The adjusting module 60 has a bushing 63 installed onto the shaft member 61 and at position of extending out from both sides of the hoop 71 and rotatable in the circular slot 13 of the frame 10. The shaft member 61 has an anchoring groove 612 disposed around the position where each bushing 63 is sheathed, and each bushing 63 has an elastic hook plate 632 installed at the inner periphery of the bushing 63 for latching into the anchoring groove 612. With the latching of the elastic hook plate 632 with the anchoring groove 612, the positioning effect for preventing the bushing 63 from slipping out is achieved.

In addition, the shaft member 61 has a first straight section 611 disposed separately at two corresponding position of the outer periphery of the shaft member 61 (wherein the included angle of the two first straight sections 611 is equal to 180°), and the hoop 71 has a second straight section 711 disposed at an inner periphery of the hoop 71 and opposite to the other side coupled to the pull rod 72 for pressing against any one of the first straight sections 611. The two bushings 63 further include a third straight section 633 disposed at two corresponding positions of the inner periphery of the bushing 63 and coupled to the first straight section 611 of the shaft member 61 to enhance the fixing effect for restricting the rotation of the shaft member 61.

In a preferred embodiment as shown in FIG. 7, the frame 10 has a stair 14 concavely formed at a rear end of the frame 10, and the vertical wall of the stair 14 has a screw hole 141, and the adjusting module 60 has two block 65 axially installed at the frame 10 and opposite to both sides of the stair 14 and swinging with respect to the frame 10. Each block 65 has a hub 62 for installing the wheel and positioning boards 651 stacked on one another and attached to the vertical wall of the stair 14. The positioning board 651 of each block 65 has a positioning through slot 652 aligned precisely with the screw hole 141 of the stair 14, and the fixing module 70 has a bolt 74 passing through the positioning through slot 652 of each block 65 and screwed into the screw hole 141 of the stair 14.

In a preferred embodiment as shown in FIG. 7, the bolt 74 of the fixing module 70 is provided for pressing the positioning board 651 of the block 65 towards the vertical wall of the stair 14 of the frame 10 to achieve the effect of fixing the angle of the axes of the two wheels 52 of the rear wheel set. After the bolt 74 of the fixing module 70 is loosened, the block 65 can be turned to adjust the two wheels 52 of the rear wheel set to a downwardly tapered status or an upwardly tapered status.

Figure 8:
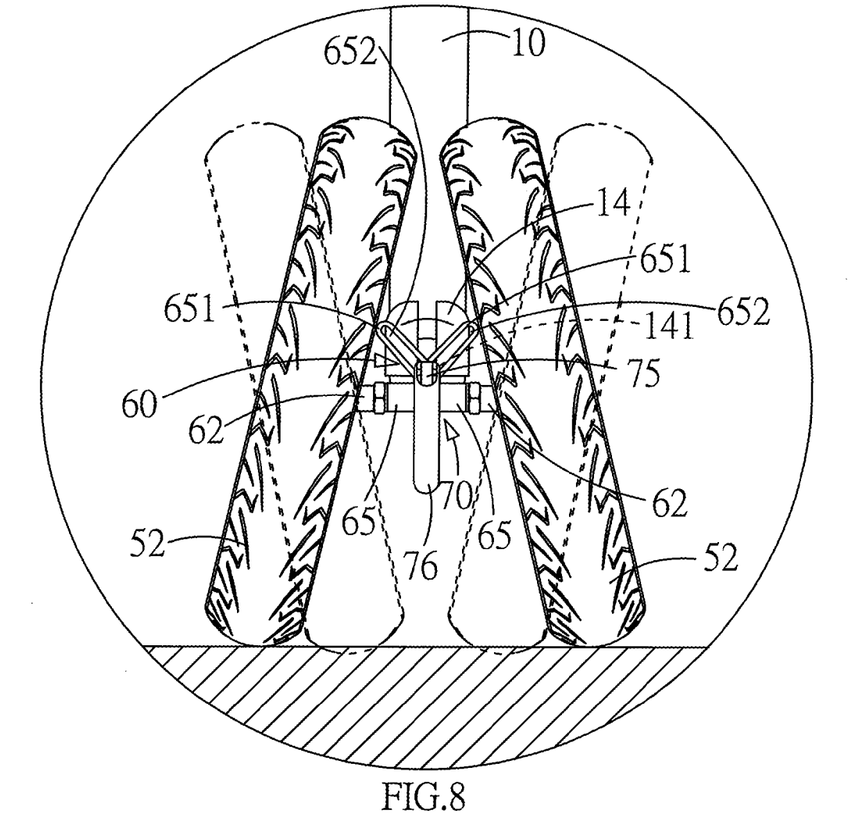
FIG. 8 is a schematic view of a using status of a rear wheel set of a third preferred embodiment of the present invention.

In a preferred embodiment as shown in FIG. 8, the frame 10 also has a stair 14 concavely formed at a rear end of the frame 10, and a screw hole 141 formed on a vertical wall of the stair 14, and the adjusting module 60 has two blocks 65 axially installed at the frame 10 and opposite to both sides of the stair 14 and swinging with respect to the frame 10, and each block 65 includes a hub 62 for installing the wheel, and positioning boards 651 stacked on one another and attached onto the vertical wall of the stair 14, and the positioning board 651 of each block 65 has a positioning through slot 652 aligned precisely with the screw hole 141 of the stair 14. The difference between this embodiment and other embodiments resides on that the fixing module 70 has a bolt 75 passing through the positioning through slot 652 of each block 65 and screwed into the screw hole 141 of the stair 14, and the bolt 75 has a cam wrench 76 pivotally installed at a rear end of the bolt 75, and the combination of the bolt 75 and the cam wrench 76 substitutes the design of the original single bolt to achieve the effects of providing a quick release or pressing the positioning board 651 of the block 65 towards the vertical wall of the stair 14 of the frame 10.

It is noteworthy that each preferred embodiment of the present invention has two parallel wheels installed at the rear wheel set (wherein the axes of the two wheels are not configured to be aligned on the same horizontal line), or the front wheel set has two parallel wheels (wherein the axes of the two wheels are not configured to be aligned on the same horizontal line), or both front wheel set and rear wheel set have two parallel wheels (wherein the axes of the two wheels of the front wheel set or rear wheel set are not configured to be aligned on the same horizontal line) in order to produce the same effect of adjusting the width of the front and/or rear wheels that touch the ground, so as to improve the variability, adaptability and practicality. In addition, each preferred embodiment adopts the children balancing vehicle to illustrate the present inventions, yet the invention may also be applied to other recreational vehicles such as scooters, etc.

Specifically, the recreational vehicle of the present invention has the following advantages and effects:

1. A user can adjust the width of the wheel that touches the ground according to the user's age and riding skill, and thus the invention provides a more practical and safe ride.

2. The recreational vehicle of the invention can satisfy the requirements of children of different ages, and thus the invention provides better adaptability.

3. The whole recreational vehicle can be erected for parking or storage by setting the two wheels with a greater tire tread spacing of the front wheel set, the rear wheel set, or both front wheel set and rear wheel set to be touched with the ground, and thus the invention improves the convenience of use.

What is claimed:

1. A recreational vehicle, comprising:
  a front wheel set and a rear wheel set installed at a front and a rear of a frame respectively and provided for touching the ground, characterized in that two wheels are installed side-by-side on an integral shaft member at the front wheel set or the rear wheel set of the recreational vehicle, wherein the shaft member includes two hubs, wherein each hub is configured to receive one of the wheels such that the axes of the two wheels are aparallel to one another, wherein the integral shaft member is included in an adjusting module that is capable of moving with respect to the frame; and
  a fixing module installed between the frame and the adjusting module for controlling whether or not the adjusting module is free to move with respect to the frame,
  wherein the frame has a circular slot transversally formed at the frame, and the fixing module has a hoop pluggable into the circular slot and displaceable in the circular slot, and a pull rod is passed from an outer side of the frame through a wall of the circular slot and coupled to the hoop, and a cam wrench is pivotally installed at a rear end of the pull rod for dragging the pull rod to move reciprocally in an axial direction, and the shaft member is set into the hoop and is rotatable in the hoop, and the shaft member abuts against the circular slot and no longer rotates as the hoop is dragged by the cam wrench and the pull rod, or the shaft member does not abut the circular slot to allow a change in the orientation of the hubs.

2. The recreational vehicle of claim 1, wherein the adjusting module comprises a knob installed on an outer side of one of the wheels of the front wheel set or the rear wheel set and coupled to the hub installed at the wheel, and the knob can be rotated together with the shaft member.

3. The recreational vehicle of claim 1, wherein the shaft member has two first straight sections disposed separately at two opposite positions of an outer periphery of the shaft member, and the hoop has a second straight section disposed at the inner periphery and opposite to the other side coupled to the pull rod for pressing any one of the first straight sections.

4. The recreational vehicle of claim 1, further comprising a front tube and a seat tube installed at the front and a middle section of the frame respectively, and a front fork installed at the front tube, and a handlebar being installed at a top end of the front fork, and the front wheel set having a wheel axially installed at a bottom end of the front fork, and a seat being mounted on the seat tube.

5. A recreational vehicle, comprising:
a front wheel set and a rear wheel set installed at a front and a rear of a frame respectively and provided for touching the ground, characterized in that two wheels are installed side-by-side on an integral shaft member at the front wheel set or the rear wheel set of the recreational vehicle, wherein the shaft member includes two hubs, wherein each hub is configured to receive one of the wheels such that the axes of the two wheels are aparallel to one another, wherein the integral shaft member is included in an adjusting module that is capable of moving with respect to the frame; and
a fixing module installed between the frame and the adjusting module for controlling whether or not the adjusting module is free to move with respect to the frame,
wherein the frame has a circular slot transversally formed at the frame, and the fixing module has a hoop pluggable into the circular slot and displaceable in the circular slot, and a pull rod is passed from an outer side of the frame through a wall of the circular slot and coupled to the hoop, and a cam wrench is pivotally installed at a rear end of the pull rod for dragging the pull rod to move reciprocally in an axial direction, and the shaft member is set into the hoop and is rotatable in the hoop, and a plurality of bushings rotatable with the shaft member in the circular slot is fixed separately at a plurality of positions of the shaft member extending outwardly from both sides of the hoop, and the shaft member abuts against the circular slot and no longer rotates as the hoop is dragged by the cam wrench and the pull rod, or the shaft member does not abut the circular slot to allow a change in the orientation of the hubs.

6. The recreational vehicle of claim 5, wherein the adjusting module comprises a knob installed at an outer side of one of the wheels of the front wheel set or the rear wheel set and coupled to the hub installed at the wheel, and the knob can be rotated together with the shaft member.

7. The recreational vehicle of claim 5, wherein the recreational vehicle comprises a groove formed at an outer periphery of one of the bushings for limiting a rotating angle of the shaft member, and at least one bump formed at an inner periphery of the circular slot of the frame for extending into the corresponding groove.

8. The recreational vehicle of claim 5, further comprising a groove formed at an outer periphery of one of the bushings for limiting a rotating angle of the shaft member, at least one bump formed at an inner periphery of the circular slot of the frame for extending into the groove, wherein the adjusting module comprises a hub disposed on an outer side of one of the wheels of the front wheel set or the rear wheel set and coupled to the installed wheels, and a knob rotatable with the shaft member.

9. The recreational vehicle of claim 5, wherein the shaft member has an anchoring groove formed around a position for connecting each bushing, and an elastic hook plate disposed at an inner periphery of each bushing for latching into the anchoring groove.

10. The recreational vehicle of claim 5, wherein the shaft member has two first straight sections disposed separately at two opposite positions of an outer periphery of the shaft member, and the hoop has a second straight section disposed at the inner periphery and opposite to the other side coupled to the pull rod for pressing any one of the first straight sections.

11. The recreational vehicle of claim 5, wherein the shaft member has two first straight sections disposed separately at two opposite positions of an inner periphery of the shaft member, and the hoop has a second straight section disposed at the inner periphery and opposite to the other side coupled to the pull rod for pressing any one of the first straight sections of the shaft member, and a third straight section disposed at two corresponding positions of the inner periphery of the two bushings and coupled to the first straight section of the shaft member.

* * * * *